United States Patent [19]

Ishijo et al.

[11] Patent Number: 4,832,780

[45] Date of Patent: May 23, 1989

[54] RUBBER-COVERED CORD UNITS JOINING MACHINE

[75] Inventors: Osamu Ishijo, Osaka; Shoji Asama, Hyogo; Tsutomu Kuwabara, Osaka, all of Japan

[73] Assignee: Toyo Tire & Rubber Co., Ltd., Osaka, Japan

[21] Appl. No.: 880,745

[22] Filed: Jul. 1, 1986

[30] Foreign Application Priority Data

Jul. 2, 1985 [JP] Japan .................. 60-146396

[51] Int. Cl.$^4$ ............................................ B65H 21/00
[52] U.S. Cl. .................... 156/360; 156/378; 156/502; 156/507; 271/227
[58] Field of Search ............... 156/507, 502, 554, 360, 156/364, 157, 134, 378, 304.1, 571, 405.1, 406.4; 271/227, 228

[56] References Cited

U.S. PATENT DOCUMENTS

| | | | |
|---|---|---|---|
| 3,897,945 | 8/1975 | Faltot et al. | 271/227 |
| 4,221,627 | 9/1980 | Rost | 156/507 |
| 4,228,886 | 10/1980 | Moran | 271/227 X |
| 4,455,189 | 6/1984 | Takasuga | 156/502 |
| 4,595,447 | 6/1986 | Lindstrom | 156/364 |

FOREIGN PATENT DOCUMENTS 59-11236  1/1984  Japan .
2154518  9/1985  United Kingdom ............ 156/405.1

*Primary Examiner*—Michael W. Ball
*Assistant Examiner*—Geoffrey L. Knable
*Attorney, Agent, or Firm*—Finnegan, Henderson, Farabow, Garrett & Dunner

[57] ABSTRACT

In a rubber-covered cord units joining machine, parallelogram-shaped rubber-covered cord units are joined to one another by overlapping the edges which are in parallel with the cords thereof, thereby to form a belt-shaped rubber-covered cord product. A moving stand is movable in the lengthwise direction (Y-axis direction) and in the widthwise direction (X-axis direction). The stand is provided above a joining table on which the rear end portion of a joined rubber-covered cord unit and a not-joined rubber-covered cord unit are placed in such a manner that the not-joined rubber-covered cord unit is slightly spaced from the rear end portion of the joined rubber-covered cord unit. An end edge chuck for detachably holding the front end edge of said not-joined rubber-covered cord unit is coupled to the moving stand in such a manner that said end edge chuck is movable vertically and rotatable around the vertical axis thereof.

1 Claim, 4 Drawing Sheets

RUBBER-COVERED CORD UNITS JOINING MACHINE

BACKGROUND OF THE INVENTION

This invention relates to a rubber-covered cord units joining machine in which a number of parallelogram-shaped rubber-covered cord units are joined to one another by overlapping their edges which are in parallel with the cords thereof to form a belt-shaped rubber covered cord product which is used, for instance, for manufacturing ply-cords for automobile tires. The parallelogram-shaped rubber-covered cord units are formed as follows: A number of fiber or steel cords arranged parallel with one another are covered with rubber to form a rubber-covered cord assembly, and the rubber-covered cord assembly thus formed is cut perpendicularly or obliquely to the cords thereof, to form the aforementioned parallelogram-shaped rubber-covered cord units.

Japanese Patent Application (OPI) No. 11236/1984 has disclosed a rubber-covered cord units joining machine. In the machine, a first conveying mechanism for conveying a joined rubber-covered cord unit in the lengthwise direction and a second conveying mechanism for conveying a rubber-covered cord unit to be joined (hereinafter referred to as "a not-joined rubber-covered cord unit", when applicable) towards the rear end of the joined rubber-covered cord unit are arranged in series, a first shaping mechanism is protruded in the conveying surface between the first and second conveying mechanisms from below so that the rear end of the joined rubber-covered cord unit on the first conveying mechanism is pushed forwardly with the substantially vertical shaping surface of the front portion of the first conveying mechanism, to shape the rear end, the front end of the not-joined rubber-covered cord unit is caused to ride on the ride-on surface of the upper portion of the first shaping mechanism which is inclined upwardly, the front end is pushed backwardly by a second shaping mechanism moving downwardly to make the front end parallel with the rear end of the joined rubber-covered cord unit, and thereafter the first shaping mechanism is moved downwardly to lay the front end of the not-joined rubber-covered cord unit over the rear end of the joined rubber-covered cord unit, and the front end and the rear end are joined together under pressure.

In the above-described conventional joining machine, the rear end of the joined rubber-covered cord unit is pushed forwardly by the first shaping mechanism while the front end of the not-joined rubber-covered cord unit is pushed backwardly by the second shaping mechanism so that the rear end is made parallel with the front end and at the same time the front end is laid over the rear end for joining them together. Therefore, the rubber-covered cord units are partially curved upwardly by the pushing operation. If the front end and the rear ends are pushed greatly, then the cord units overlapped are creased by pressing. If, on the other hand, the front end and the rear end are not sufficiently pushed, then the front end of the not-joined rubber-covered cord unit or the rear end of the joined rubber-cover cord unit are pushed back by the elasticity of the upwardly curved part after the first and second shaping mechanisms have been retracted, with the result that the degree of parallelism is lowered or the not-joined rubber-covered cord unit and the joined rubber-covered cord unit are excessively overlapped. Furthermore, in the above-described conventional joining machine, the degree of parallelism and the amount of overlapping of the rear end of the joined rubber-covered cord unit and the not-joined rubber-covered cord unit are controlled; however, the positions of the rear end and the front end in the widthwise direction are not controlled. Therefore, in the case where the joined rubber-covered cord unit and the not-joined rubber-covered cord unit are shifted in the widthwise direction from each other or they are different in width from each other, steps different in length are formed on both sides of the joint line or a step is formed on one side of the joint line. In the conventional joining machine, the front end of the not-joined rubber-covered cord unit and the rear end of the joined rubber-covered cord unit are pushed as was described above. Therefore, in the case where the joining machine is used to join rubber-covered cord units for radial tires which are formed by cutting the rubber-covered cord assembly obliquely with respect to the direction of the cords, the cord units must be constant in the angle of inclination; that is, the joining machine cannot be used for a variety of rubber-covered cord units different in the angle of inclination with respect to the direction of the cords.

SUMMARY OF THE INVENTION

According to a first aspect of the invention, a moving stand which is movable in the lengthwise direction (Y-axis direction) and in the widthwise direction (X-axis direction) is provided above a joining table on which the rear end portion of a joined rubber-covered cord unit and a not-joined rubber-covered cord unit are placed in such a manner that the latter is slightly spaced from the former, and an end edge chuck for detachably holding the front end edge of the not-joined rubber-covered cord unit is coupled to the moving stand in such a manner that the end edge chuck is movable vertically and rotatably around the vertical axis thereof.

After a not-joined rubber-covered cord unit is delivered to the joining table, the moving stand is moved to the front end edge of the not-joined rubber-covered cord unit, and the end edge chuck is moved downwardly to hold the front end edge of the not-joined rubber-covered cord unit. Then, the end edge chuck is moved upwardly and turned around the vertical axis to make the front end edge parallel with the rear end edge of the joined rubber-covered cord unit on the joining table. The moving stand is moved in the widthwise direction until the middle point of the front end edge of the not-joined rubber-covered cord unit coincides with the middle point of the rear end edge of the joined rubber-covered cord unit in the widthwise direction position (X-distance). Thereafter, the moving stand is moved n the lengthwise direction (Y-axis direction) so that the middle point of the front end edge of the not-joined rubber-covered cord unit is located slightly beyond the middle point of the rear end edge of the joined rubber-covered cord unit. Under this condition, the end edge chuck is moved downwardly so that the front end edge of the not-joined rubber-covered cord unit is laid over the rear end edge of the joined rubber-covered cord unit, and these edges are joined together. Thereafter, the end edge chuck is move upwardly.

According to a second aspect of the invention, means for controlling the movement of the moving stand and the rotation of the end edge chuck is added to the first means described above. The rubber-covered cord units joining machine according to the second aspect of the invention comprises: detecting means for detecting an inclination angle of the rear end edge of a joined rubber-covered cord unit placed on a joining table with respect to the widthwise direction (X-axis direction) and the position (coordinates) of the middle point of the rear end edge, and an inclination angle of the front end edge of a not-joined rubber-covered cord unit placed on the joining table with respect to the widthwise direction (X-axis direction), and the position (coordinates) of the middle point of the front end edge; a moving stand provided above the joining table in such a manner that the moving stand is movable in the lengthwise direction and in the widthwise direction; and end edge chuck for detachably holding the front end edge of the not-joined rubber-covered cord unit, the end edge chuck attached to the moving stand in such a manner that the end edge chuck is movable vertically and rotatable around the vertical axis thereof; and control means for controlling the movement of said moving stand and said end edge chuck according to detection values outputted by the detecting means, to turn the end edge chuck so that the front end edge of the not-joined rubber-covered cord unit becomes parallel with the rear end edge of the joined rubber-covered cord unit, and to move the middle point of the front end edge slightly beyond the middle point of the rear end edge in the lengthwise direction.

The rear end portion of a joined rubber-covered cord unit and a not-joined rubber-covered cord unit are placed on the joining table, and the end edge chuck is abutted against the front end edge of the not-joined rubber covered cord unit. When, under this condition, the detecting means is operated, the inclination angle and the position of the rear end edge of the joined rubber-covered cord unit and the inclination angle and the position of the front end edge of the not-joined rubber-covered cord unit are detected. As the end edge chuck is lifted, the control means operates so that the end edge chuck is automatically turned until the front end edge of the not-joined rubber-covered cord unit becomes parallel with the rear end edge of the joined rubber-covered cord unit, while the moving stand is moved in the widthwise direction until the middle point of the front end edge of the not-joined rubber-covered cord unit coincides with the middle point of the rear end edge of the joined rubber-covered cord unit, and the moving stand is moved in the lengthwise direction until the front end edge is laid over the rear end edge under the conditions that they are in parallel with each other and their middle points coincide with each other in the widthwise direction (X-axis direction). Under this condition, the end edge chuck is moved downwardly, so that the front end edge and the rear end edge are joined together.

DETAILED DESCRIPTION OF PREFERRED EMBODIMENTS

Figure 1:
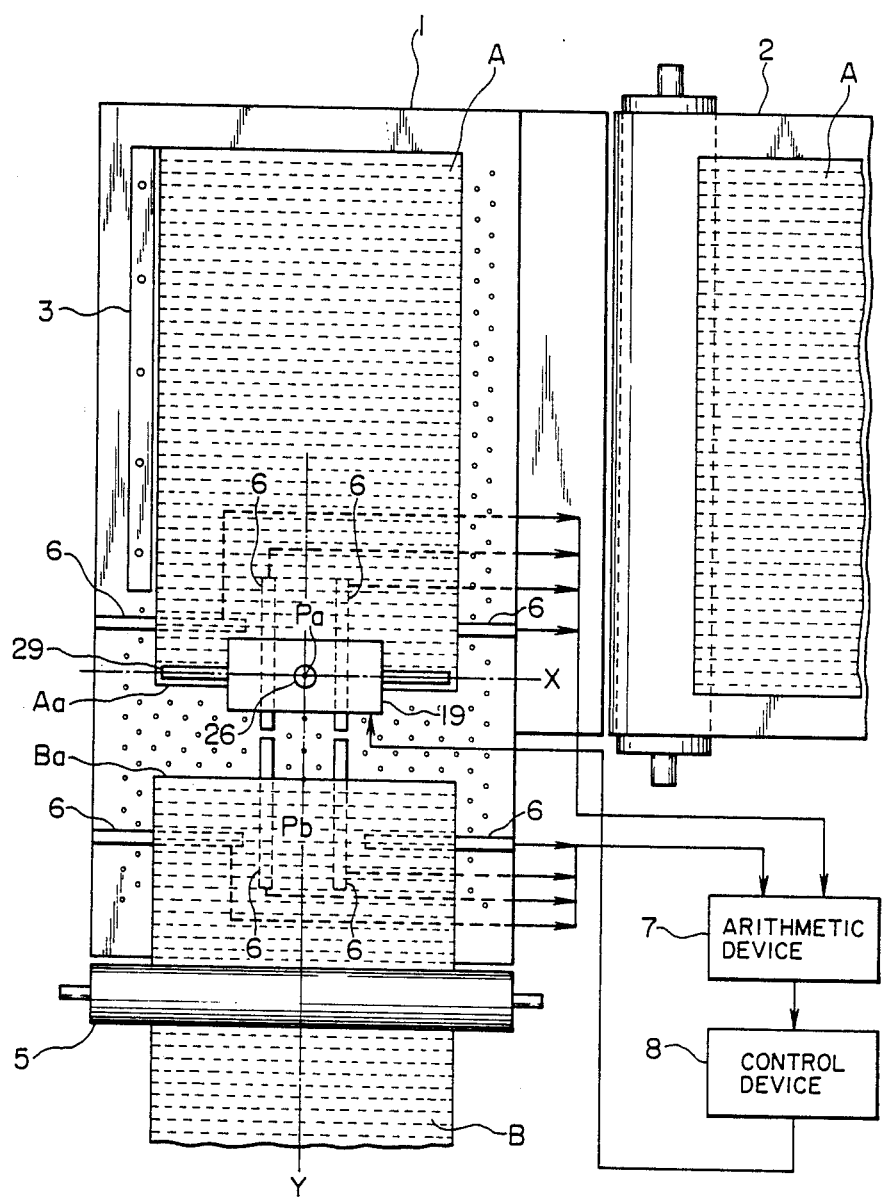
FIG. 1 is a plan view showing one embodiment of this invention.

In FIG. 1, a joining table 1 is an air table, and a supplying conveyor 2 is arranged perpendicular to the joining table 1. Rectangular not-joined rubber-covered cord units A for radial tires are conveyed by the conveyor 2 in the direction of the cords thereof to the joining table 1. The stop position of each of the rubber-covered cord units A thus delivered is regulated by a side edge stopper 3 secured to the joining table 1. There is a joined rubber-covered cord unit B on the front part (the lower part of FIG. 1) of the joining table 1 in such a manner that the rear end of the cord unit B is slightly spaced from the not-joined rubber-covered cord unit A. After the rear end edge Ba of the cord unit B is joined to the front end edge Aa of the cord unit A in an overlap manner, the cord units A and B thus joined are forwarded by a feed roller 5.

Figure 6:
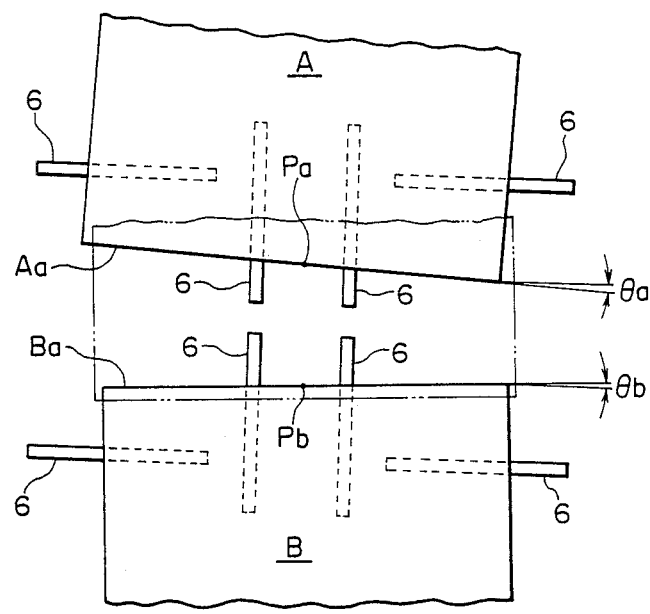
FIG. 6 is an enlarged plan view of a coordinates detecting section.

The joining table 1 has four photo-electric line sensors 6 embedded in its front part: two photo-electric line sensors for detecting the lengthwise direction position (Y-distances) of two points on the rear end edge Ba of the joined rubber-covered cord unit B, and two photo-electric line sensors for detecting the widthwise direction position (X-distance) of one point on each of two opposite side edges of the rear end edge Ba. The joining table 1 further has four photo-electric line sensors 6 embedded slightly backwardly of the aforementioned line sensors 6: two photo-electric line sensors for detecting the lengthwise direction positions (Y-distances) of two points on the front end edge Aa of the not-joined rubber-covered cord unit A, and two photo-electric line sensors for detecting the widthwise direction position (X-distance) of one point on each of two opposite side edges which are on both sides of the front end edge Aa. These photo-electric line sensors 6 provide output signals according to the lengths of exposure time. The output signals are applied to an arithmetic device 7. As a result, the inclination angle $\theta$-b of the rear end edge Ba with respect to the widthwise direction (X-axis direction) (cf. FIG. 6), and the X- and Y-distances of the middle point Pb of the rear end edge Ba are calculated. In addition, the inclination angle $\theta a$ of the front end edge Aa with respect to the widthwise direction (X-axis direction), and the X- and Y-distances of the middle point of the front end edge Aa are calculated. That is, the aforementioned photo-electric line sensors 6 and arithmetic device 7 form means for determining the inclination angles $\theta a$ and $\theta b$ and the coordinates of the middle points Pa and Pb. The values provided by the determining means are supplied to a control device 8, so that the operations of a moving stand 19 and a rotating stand 25 (described later) are controlled.

Figure 2:
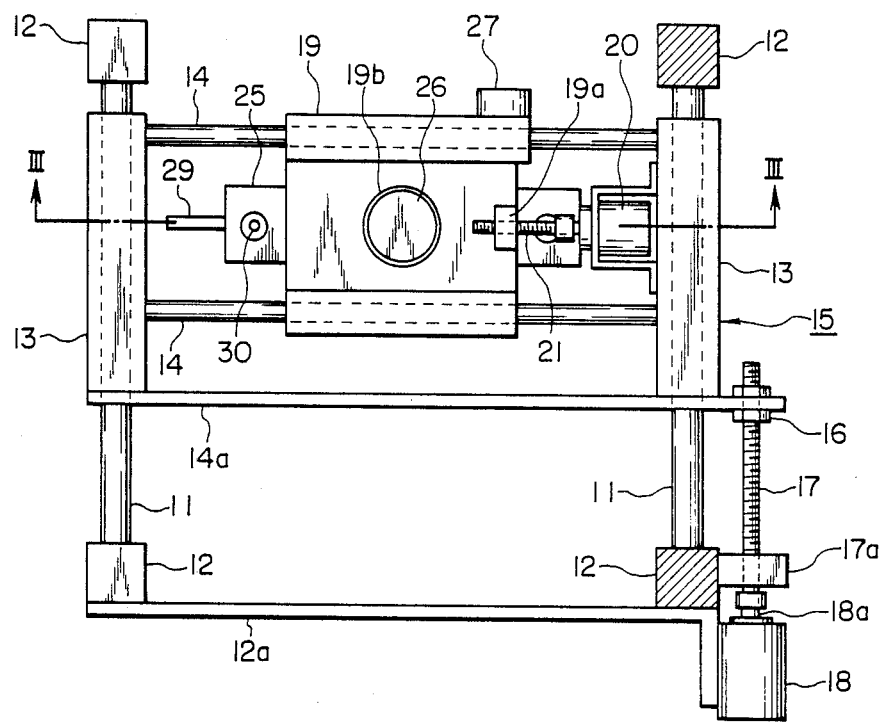
FIG. 2 is an enlarged plan view showing essential components of the embodiment shown in FIG. 1.
Figure 3:
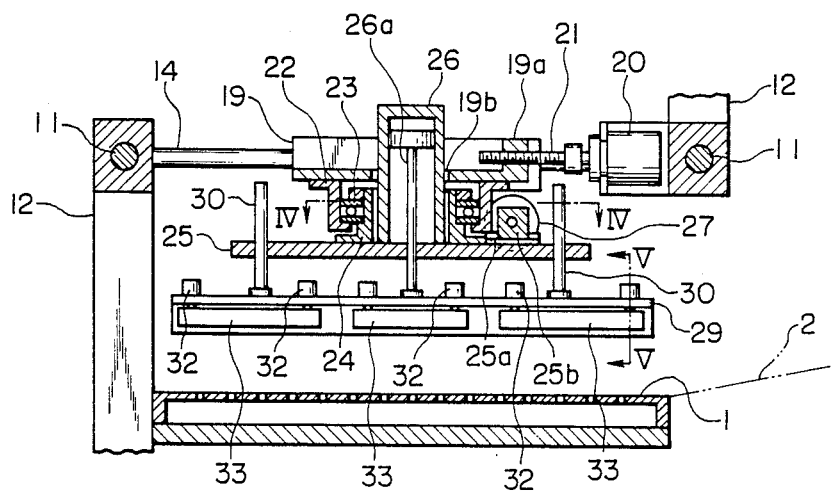
FIG. 3 is a sectional view taken along line III—III in FIG. 2.

As shown in FIGS. 2 and 3, a pair of Y-axis rails 11 are provided above the joining table 1. More specifically, the Y-axis rails 11 are supported by supporting posts 12 in such a manner that the rails are in parallel with each other. The right and left supporting posts 12 are connected through a horizontal stay 12a to each other. It should be noted that the Y-axis rail 11 on the side of the supplying conveyor 2 is suspended from above. Cylindrical sliding blocks 13 are slidably put on the right and left Y-axis rails 11 and 11, respectively.

The right and left sliding blocks 13 and 13 are coupled to each other through two front and rear X-axis rails 14 and 14 which are in parallel with the widthwise direction (X-axis direction), and through a front stay 14a, thus forming a rectangular sliding frame 15. A nut 16 is rotatably mounted on one end portion of the front stay 14a, and a Y-axis feed screw is screwed into the nut 16. The Y-axis feed screw 17 is connected to the rotary shaft 18a of a Y-axis motor 18 secured to the horizontal stay 12a, so that the Y-axis feed screw can be turned in the forward direction or in the reverse direction by the motor. Further in FIG. 2, reference numeral 17a designates a bearing. The moving stand 19 mentioned above is slidably mounted on the two X-axis rails 14 and 14, and has a nut 19a fixedly secured to its one side edge. An X-axis feed screw 21 is screwed into the nut 19a of the moving stand 19. The X-axis feed screw 21 is driven by an X-axis motor 20 secured to the inner surface of the sliding block 13. That is, as the Y-axis motor 18 and the X-axis motor 20 rotate, the moving stand 19 is moved in the widthwise direction (X-axis direction) and in the lengthwise direction (Y-axis direction).

Figure 4:
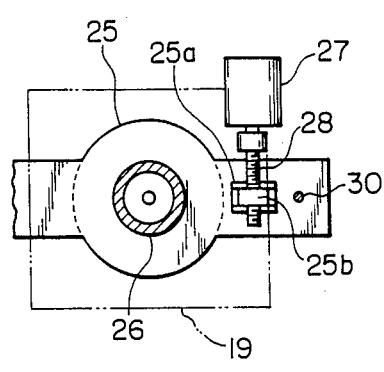
FIG. 4 is a sectional view taken along line IV—IV in FIG. 3.

The rotating stand 25 is rotatably suspended from the moving stand 19 through an outer cylinder 22 secured to the moving stand, a bearing 23 and an inner cylinder 24. A lifting air cylinder 26 is fixedly mounted on the upper surface of the rotating stand 25 at the center. The upper portion of the lifting air cylinder 26 is protruded through the central hole 19b of the moving stand 19. A nut 25b is provided beside the lifting air cylinder 26 through a sliding guide 25a in such a manner that it is slidable in the widthwise direction (cf. FIG. 4). An angle feed screw 28 is screwed into the nut 25b. The angle feed screw 28 is directly coupled to the output shaft of an angle motor 27 which is secured to the lower surface of the rear portion of the moving stand. The lifting air cylinder 26 has a piston rod 26a which extends downwardly as shown in FIG. 3. An end edge chuck 29 extended in the widthwise direction is secured to the end of the piston rod 26a. Guide rods 30 are secured to the upper surfaces of the right and left end portions of the end edge chuck 29 in such a manner that they are extended upwardly. The guide rods 30 are slidably passed through guide holes formed in the right and left portions of the rotating stand 25, respectively.

Figure 5:
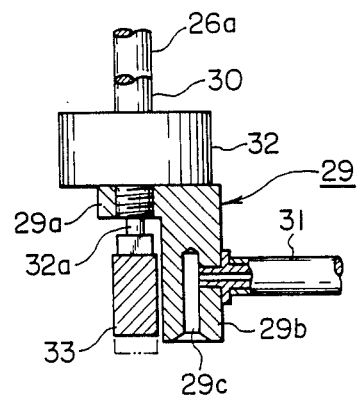
FIG. 5 is a sectional view taken along line V—V in FIG. 3.

The end edge chuck 29 is inverted-L-shaped in section as shown in FIG. 5. The end edge chuck 29 has a horizontal portion 29a and a vertical portion 29b. The lower ends of the piston rod 26a and the guide rods 30 are secured to the horizontal portion 29a. A number of suction holes 29c are formed in the lower surface of the vertical portion 29b, and are connected through a hose 31 to a suction pump (not shown). On the other hand, a plurality of pressing air cylinders are provided on the upper surface of the horizontal portion 29a at predetermined intervals. The piston rods 32a of the air cylinders 32 extend downwardly of the horizontal portion 29a, and their ends are connected to pressing bars 33. In the embodiment, as shown in FIG. 3, three pressing bars 33 are used, and each pressing bar 33 is connected to two air cylinders 32.

As the Y-axis motor 18 and the X-axis motor 20 are rotated, the moving stand 19, the rotating stand 25 coupled to the moving stand 19, and the end edge chuck 29 are moved in the lengthwise direction (Y-axis direction) and in the widthwise direction (X-axis direction). As the angle motor 27 is driven, the rotating stand 25 is turned.

The chuck 29 is moved vertically by the lifting air cylinder 26.

The supplying conveyor 2 supplies a not-joined rubber-covered cord unit A onto the joining table 1, and the not joined rubber-covered cord unit A thus supplied is held at the predetermined position by the stopper 3. The end edge chuck 29 is set in the widthwise direction, and its rotation center is coincided with the origin of the coordinate system. Under this condition, the chuck 29 is moved downwardly so that the lower surface of the chuck 29 is abutted against the portion of the not-joined rubber-covered cord unit A which is slightly set back from its front end edge Aa. In synchronism with this abutment, the photo-electric line sensors 6 and the arithmetic device 7 are operated to detect the inclination angle $\theta a$ of the front end edge Aa of the not-joined rubber-covered cord unit A, the coordinates of the middle point Pa of the front end edge Aa, the inclination angle $\theta b$ of the rear end edge Ba of the joined rubber-covered cord unit B, and the coordinates of the middle point Pb of the rear end edge Ba. The detection values are utilized to calculate the amount of rotation of the angle motor 27 required for making the front end edge Aa of the not-joined rubber-covered cord unit A parallel with the rear end edge Ba of the joined rubber-covered cord unit B, the amount of rotation of the X-axis motor 20 required for coinciding the X-distance of the middle point Pa of the front end edge Aa with that of the middle point Pb of the rear end edge Ba, and the amount of rotation of the Y-axis motor 18 required for laying the front end edge Aa of the not-joined rubber-covered cord unit A over the rear end edge Ba of the joined rubber-covered cord unit B as much as required (about 3 mm). On the other hand, in synchronization with the abutment of the chuck 29, a suction force acts on the suction holes 29c formed in the lower surface of the chuck 29. As a result, the portion of the cord unit A which is slightly set back from the front end edge Aa is sucked and retained by the end edge chuck 29. The lifting air cylinder 26 operates to lift the end edge chuck 29 and accordingly the front end edge Aa. In synchronization with the lifting operation, the angle motor 27, the X-axis motor 20 and the Y-axis motor 18 are rotated. The amounts of rotation of these motors are controlled by the control device 8, so that the front end edge Aa of the not-joined rubber-covered cord unit A held by the chuck 29 is placed above the rear end edge Ba of the joined rubber-covered cord unit B while its direction is being corrected. Thereafter, the chuck 29 is moved downwardly, so that the front end edge Aa is laid over the rear end edge Ba. Under this condition, the air suction through the suction holes 29c is suspended, and the piston rods 32a of the pressing air cylinders 32 are moved downwardly, so that the front end edge Aa is pressed by the lower surfaces of the pressing bars 33 to join the front end edge Aa and the rear end edge Ba together. After this joining operation, the end edge chuck 29 and the moving stand 19 are returned to their original positions.

In the above-described embodiment, the air table is employed as the joining table 1. Therefore, the not-joined rubber-covered cord unit A can be smoothly conveyed, and it can be readily moved with the end edge chuck 29. Furthermore, in the above-described embodiment, the nut 25b for the angle feed screw 28 is slidable along the sliding guide 25a extended in the widthwise direction, and therefore the rotating stand 25 can rotate smoothly. The above-described embodiment may be so modified that a worm gear is coaxially fixed to the rotating stand 25, and the latter 25 is turned with a worm connected to the angle motor 27. While the invention has been described with reference to rubber-covered cords for radial tires, the technical concept of the invention can be equally applied to those for bias tires in which the cords are laid obliquely.

Figure 7:
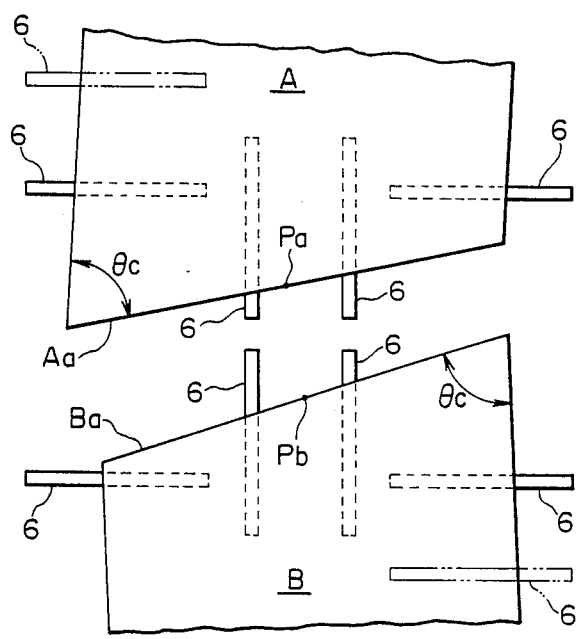
FIG. 7 is an enlarged partial, top plan visual showing another embodiment.

FIG. 7 shows an example of an apparatus that is suitable for a rubber-covered cord for a bias tire (a leading edge Aa of a not-joined rubber-covered cord A and a trailing edge Ba of a joined rubber-covered cord B are, respectively, intersected with side edges at an angle $\theta c$ that is less than 90°). In order to detect, respectively, an X-coordinate of one of the side edges of the not-joined rubber-covered cord A and an X-coordinate of one of the side edges of the joined rubber-covered cord B, photo-electric line sensors 6 are arranged in one-to-one relation as indicated by dotted lines. The above-described angle $\theta c$ is stored in advance in the arithmetic device 7, so that the positions of the not-joined rubber-covered cord A and the joined rubber-covered cord B are computed on the basis of the data out of the five photo-electric line sensors 6. Also, the edge chuck 29 may serve to set the position where the not-joined rubber cord A's edge Aa is held in accordance with the position of the edge Aa detected by the above-described photo-electric line sensors.

In the rubber-covered cord units joining machine according to the invention, the end edge chuck which can move vertically is rotatably coupled to the moving stand which is movable in the lengthwise direction and in the widthwise direction, and the end edge chuck thus coupled is used to hold the front end edge of a not-joined rubber-covered cord unit. Therefore, the front end edge of the not-joined rubber-covered cord unit can be placed in parallel with the rear end edge of the joined rubber-covered cord unit, and the not-joined rubber-covered cord unit and the joined rubber-covered cord unit can be joined together with the front end edge laid over the rear end edge in such a manner that the middle point of the rear end edge coincides with that of the front end edge. The not-joined rubber-covered cord unit is moved by holding its front end edge under the condition that the joined rubber-covered cord unit is at rest. Therefore, the rubber-covered cord product will never be creased.

We claim:

1. A machine for joining rubber-covered cord units in which parallelogram-shaped rubber-covered cord units, having a front end edge and a rear end edge, are joined to one another by overlapping the edges which are in parallel with the cords thereof, thereby to form a belt-shaped rubber-covered cord product, said machine comprising:

a joining table having a Y-axis direction and an X-axis direction;

means for determining an inclination angle of the rear end edge of a joined rubber-covered cord unit placed on said joining table with respect to the X-axis direction, and a position of the middle point of said rear end edge, and an inclination angle of the front end edge of a not-joined rubber-covered cord unit placed on said table with respect to the X-axis direction, and a position of the middle point of said front end edge, wherein said determining means outputs values representative of said inclination angles and said middle point positions;

a moving stand provided above said joining table in such a manner that said moving stand is movable in only a single plane above said joining table, wherein said single plane is parallel to a plane defined by the Y-axis direction and by the X-axis direction;

a rotating stand coupled to said moving stand for rotation around a vertical axis perpendicular to both the Y-axis direction and the X-axis direction and extending through the center of said rotating stand and the center of said moving stand;

end edge chuck means for detachably holding only the front end edge of said not-joined rubber-covered cord unit, said end edge chuck means being attached to said rotating stand for reciprocal movement along and rotatable movement around said vertical axis; and control means for controlling the movement of said moving stand and said end edge chuck means according to values outputted by said determining means, and for turning said end edge chuck means so that the front end edge of said not-joined rubber-covered cord unit becomes parallel with the rear end edge of said joined rubber-covered cord unit, and for moving the middle point of said front end edge beyond the middle point of said rear end edge in the Y-axis direction.

* * * * *